C. A. HOFSTETTER.
LOOSE LEAF LEDGER.
APPLICATION FILED FEB. 15, 1909.
945,845.
Patented Jan. 11, 1910.
2 SHEETS—SHEET 1.
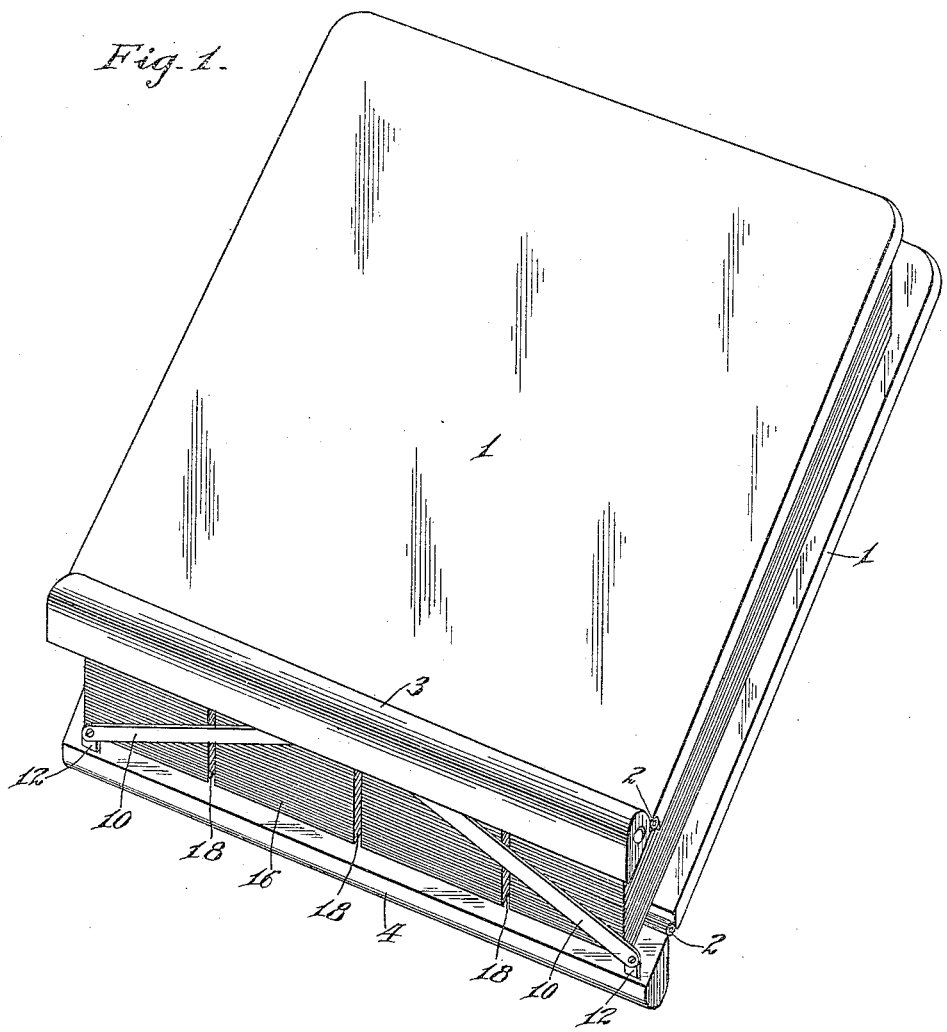
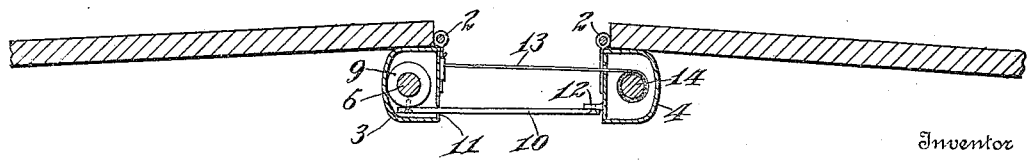
Witnesses
Inventor
Charles A. Hofstetter,
By Joshua R. H. Potts
Attorney C. A. HOFSTETTER.
LOOSE LEAF LEDGER.
APPLICATION FILED FEB. 15, 1909.
945,845.
Patented Jan. 11, 1910.
2 SHEETS—SHEET 2.
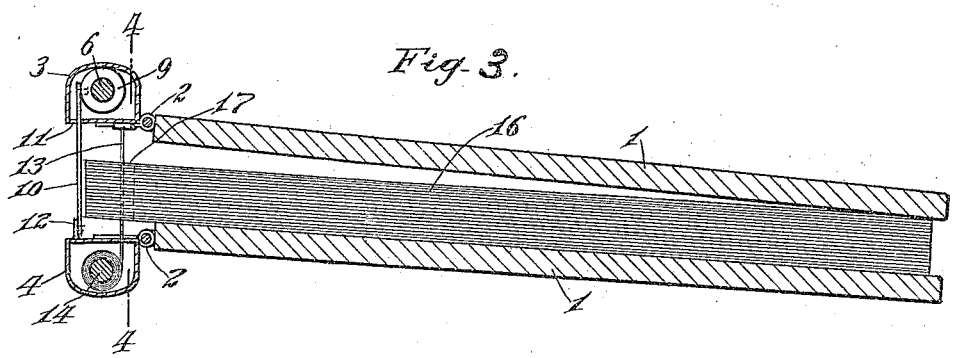
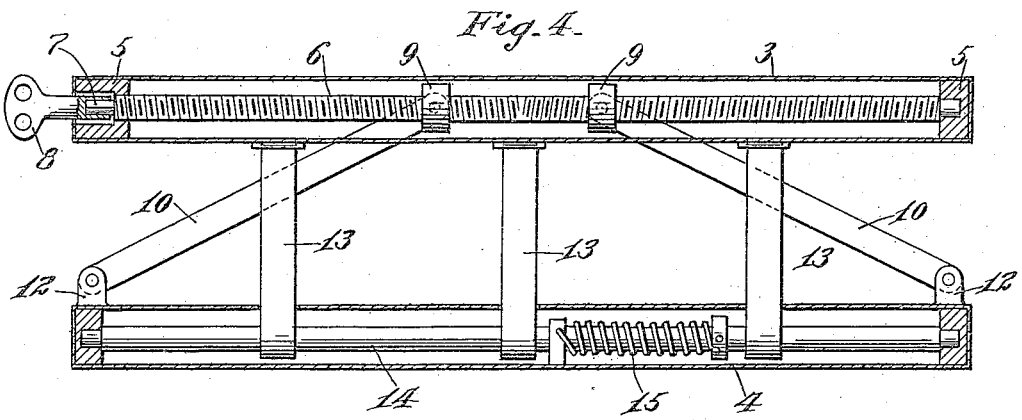
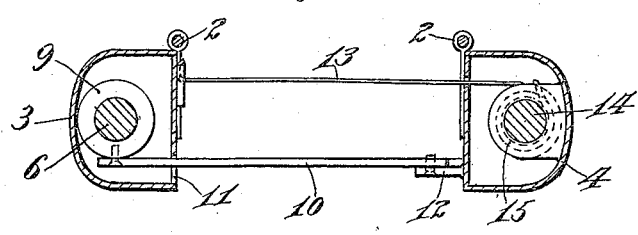
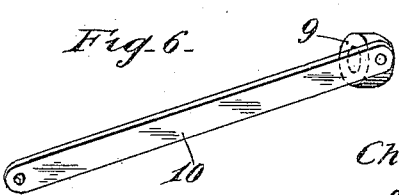
Witnesses
Theo. Cremand
J. T. L. Mulhall
Inventor
Charles A. Hofstetter,
By Joshua R. H. Potts
Attorney

UNITED STATES PATENT OFFICE.

CHARLES A. HOFSTETTER, OF CRESCENTVILLE, PENNSYLVANIA.

LOOSE-LEAF LEDGER.

945,845.  Specification of Letters Patent.  Patented Jan. 11, 1910.

Application filed February 15, 1909. Serial No. 477,934.

*To all whom it may concern:*

Be it known that I, CHARLES A. HOFSTETTER, a citizen of the United States, residing at Crescentville, in the county of Montgomery and State of Pennsylvania, have invented certain new and useful Improvements in Loose-Leaf Ledgers, of which the following is a specification.

My invention relates to improvements in loose leaf ledgers, the object of the invention being to provide an improved construction of clamp adjusting mechanism, whereby the leaves may be securely clamped or released, so that old sheets may be removed, or new ones added.

A further object is to provide improvements of this character, which will be neat and attractive in appearance, strong and durable in use, and which will most effectually serve the purpose intended.

With these and other objects in view, the invention consists in certain novel features of construction, and combinations, and arrangements of parts as will be more fully hereinafter described and pointed out in the claims.

In the accompanying drawings, Figure 1, is a perspective view illustrating my improvements. Fig. 2, is a view in longitudinal section showing the back open. Fig. 3, is a view similar to Fig. 2, but showing the backs closed on the leaves. Fig. 4, is a view in section on the line 4—4 of Fig. 3. Fig. 5, is an enlarged view in cross section through the binder, and Fig. 6, is a detail perspective view of one of the links 10.

1, 1, represent the stiff backs of the ledger, which are connected by elongated hinges 2, with approximately semi-cylindrical metal casings 3 and 4 respectively. The casing 3 is provided with bearings 5 for a rod 6, the latter having right and left screw threads extending from the center to the ends. One end of this rod 6 is made angular as shown at 7 for the reception of a key 8 to turn the same. Internally screw threaded collars 9 are located on the rod 6 at opposite sides of its center, and to these collars, links 10 are pivotally connected, are movable in an elongated slot 11 in the casing 3, and are pivotally connected at their other ends to lugs 12 on the casing 4 at the ends of the latter, so that when the rod 6 is turned by its key, the collars 9 will be moved toward or away from the center of the rod, and hence the links 10 will be moved so as to force the casings apart, or draw them together as the case may be.

13, 13, 13, represent strips or tapes, preferably of flexible material secured at one end to the outside of casing 3, and at their other ends projecting through the slots in casing 4, and wound upon a rod 14 having rotary mounting in the casing 4. A spring 15 is mounted on rod 14, and exerts a continual pressure on said rod to turn the same, and wind the tapes 13 thereon, when permitted by the movement of the casings toward each other. The loose leaves 16 are provided with openings 17 near their ends, and recesses 18 at their ends communicate with the openings 17 to enable the leaves to be inserted on the tapes or removed therefrom.

In operation after the leaves have been placed upon the tapes, the rod 6 is turned by its key to draw the collars 9 toward the center of the rod, and hence move the casings toward each other to securely clamp the leaves, the tapes 13 winding on the spring-pressed rod 14 and take up all slack in the tapes.

By reason of a construction of this character, the adjustments can be quickly made and the size of the ledger is only limited to the length of the links 10.

A great many slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. In a device of the character described, the combination with two elongated casings, and backs hinged to said casings, of a rod inclosed within a casing, and oppositely screw threaded from its center toward its ends, internally screw threaded collars on said rod in the casing, said rod containing casing having a longitudinal slot, and links pivotally connected to the other casing projecting through said slot, and pivotally connected to said collars, and a spring turned rod inclosed within the other casing, said last mentioned casing having slots or openings, and tapes secured at one end to the outside of the threaded rod containing casing and extending through said slots, and secured to the spring turned rod.

2. In a device of the character described, the combination with two elongated casings, backs hinged to said casings, blocks in the ends of said casings, rods inclosed within said casings, and journaled to turn in said blocks, one of said rods oppositely screw threaded from its center toward its ends, and said rod having an angular key receiving end, of internally screw threaded collars on said threaded rod at opposite sides of its center, links pivotally connected to the said collars, and to the other rod containing casing, a spring exerting rotary pressure on the rod in said last mentioned casing, and tapes secured at one end to the threaded rod containing casing, and at their other ends to said spring pressed rod.

In testimony whereof I have signed my name to this specification in the presence of two subscribing witnesses.

CHARLES A. HOFSTETTER.

Witnesses:
R. H. KRENKEL,
J. A. L. MULHALL.